United States Patent [19]

Andersson

[11] Patent Number: 5,067,421
[45] Date of Patent: Nov. 26, 1991

[54] SEED-DISPENSING APPARATUS

[75] Inventor: Morgan Andersson, Lit, Sweden

[73] Assignee: Robur Maskin AB, Bracke, Sweden

[21] Appl. No.: 518,124

[22] Filed: May 3, 1990

[30] Foreign Application Priority Data

May 31, 1989 [SE] Sweden .................. 8901954

[51] Int. Cl.⁵ .................................. A01C 7/18
[52] U.S. Cl. .......................... 111/36; 111/34; 111/174
[58] Field of Search .............. 111/15, 34, 36, 37, 111/170, 174

[56] References Cited

U.S. PATENT DOCUMENTS

| | | |
|---|---|---|
| 1,477,097 | 12/1923 | Anderson et al. |
| 1,785,926 | 12/1930 | Batchelor .................. 111/170 X |
| 2,415,577 | 2/1947 | Bushue ...................... 111/170 |
| 2,768,770 | 10/1956 | Morse et al. ............... 111/170 X |

FOREIGN PATENT DOCUMENTS

| | | |
|---|---|---|
| 93345 | 12/1896 | Fed. Rep. of Germany . |
| 611370 | 9/1926 | France . |
| 11579 | 2/1902 | Norway . |
| 8809608 | 12/1988 | PCT Int'l Appl. ............ 111/170 |
| 63331 | 9/1925 | Sweden . |
| 0622434 | 9/1978 | U.S.S.R. ..................... 111/170 |
| 1028263 | 7/1983 | U.S.S.R. ..................... 111/170 |

Primary Examiner—Dennis L. Taylor
Assistant Examiner—Jeffrey L. Thompson
Attorney, Agent, or Firm—Collard, Roe & Galgano

[57] ABSTRACT

The present invention relates to apparatus for sowing seed, particularly seed for reforestation, intermittently or continuously in a precise and controlled manner. The inventive apparatus includes at least one seed-magazine and at least one seed-dispensing aperture. In order to utilize the germination potential of the seed in to the cultivated soil in which the seed is sown, it is proposed in accordance with the invention that the apparatus will include at least one seed-carrier provided with means for receiving discrete seeds from the seed-magazine. The apparatus includes force-transmission means by means of which the seed-carrier is moved between a seed-receiving position and at least one seed-dispensing position, in which the seed-carrier communicated with the seed-dispensing aperture and in which seed carried by the seed-carrier is caused to fall down through the seed-dispensing aperture.

9 Claims, 2 Drawing Sheets

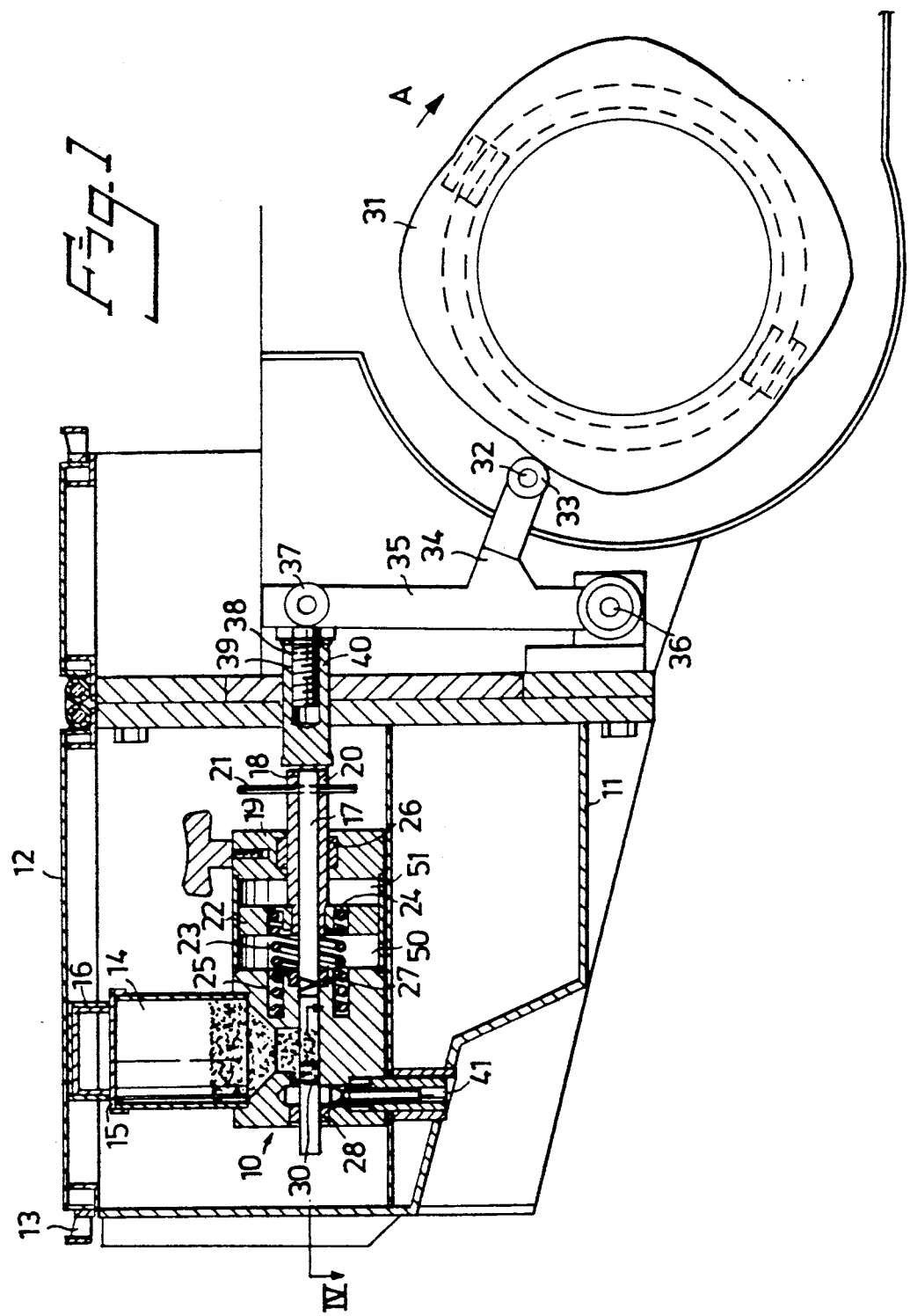

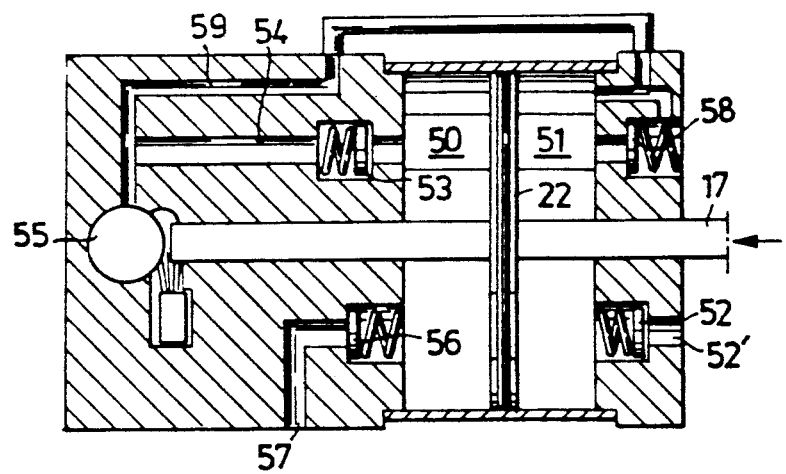
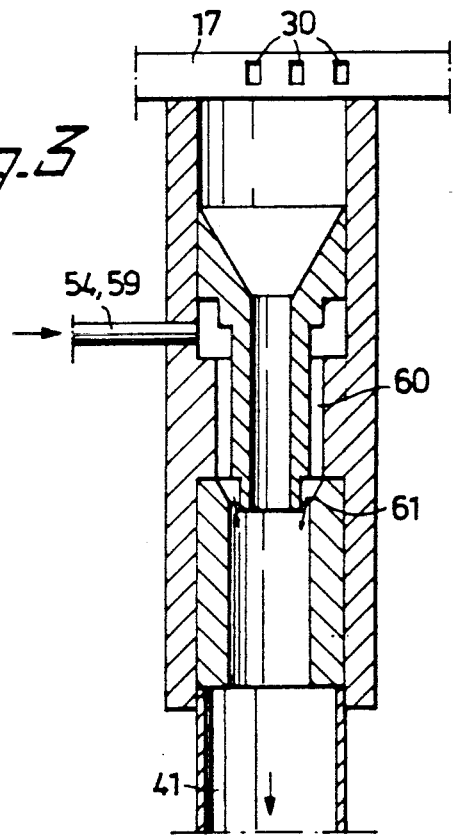
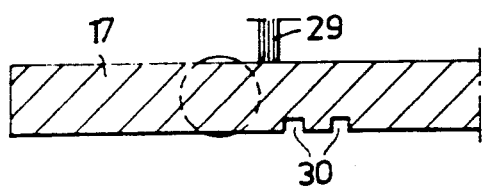

SEED-DISPENSING APPARATUS

The present invention relates to seed-dispensing apparatus operative to dispense seed onto the ground in a precise and controlled manner, and comprising at least one seed-magazine and at least one seed-dispensing aperture.

More particularly, but not exclusively, the invention relates to seed-dispensing apparatus intended for use in the replanting of forests, i.e. reforestation, where seed is dispensed onto cultivated ground, either intermittently or continuously.

Two principal methods of reforestation are known to the art. One of these methods involves the manual planting of young plants or seedlings and the other involves sowing seed directly onto ground to be reforested. Both of these methods involve the mechanical preparation of a long continuous furrow or of a number of shorter, broken furrows.

Both of the methods applied hitherto have drawbacks. For instance, in the former of the aforesaid two methods young plants are taken from a protected environment to a natural, unprotected environment and when planted many of the plants are unable to survive, while others develop poor root systems. Furthermore, the task of planting young plants requires the use of a relatively large work force and therewith incurs considerably expense.

Theoretically, seed that is sown on good, fertile soil will give better results. For instance, a fully matured tree grown from seed will often be of better quality than the tree which has matured from a young plant or seedling. However, in terms of kilo-weight, seed is much more expensive than young plants and in order to provide an economic yield needs to be sown with a precision not hitherto achieved. Aerial-sowing techniques have also been practiced. Seed sown by such techniques, however, will fall randomly to the ground and will lack direction—as will readily be understood.

Consequently, a main object of the present invention is to provide an apparatus of the aforesaid kind by means of which seeds can be dispensed piecemeal and with precision onto/into cultivated soil. By precision is meant here and in the following that the seed dispensed by the apparatus will be brought into contact with the ground, which is normally cultivated beforehand, with relative exactitude and with the seed lying in rows in spaced relationship there along. The manner in which seed is placed on or in the seed bed can be decisive in whether the seed will germinate and grow. By "piecemeal" is meant here and in the following any number of seeds from one to a larger number. Thus, the word "piecemeal", as used here, may include a number of up to six or seven seeds, depending for instance on the viability assessment of the seeds and the area of the cultivated ground in the case of intermittent sowing.

The improved apparatus according to the present invention includes at least one seed-carrier which is provided with means for receiving mutually discrete seeds from the seed-magazine, i.e. seed which is not lumped together, normally a small number of seeds, and which is arranged to be moved forcibly to a seed-dispensing position in which the carrier communicates with at least one seed-dispensing aperture, and in which apparatus seed carried by said carrier is caused to fall down through said dispensing aperture or apertures.

The seed-dispensing aperture or apertures is/are positioned so as to face the cultivated ground-surface and when said aperture(s) is located at only a short distance from the ground, the seeds will be deposited precisely in rows, essentially one seed at a time. When the ground has been prepared or cultivated in a prescribed manner, the chances that the seed will germinate and grow are very high. The inventive seed-dispensing apparatus is provided with attachment means which enable it to be fitted detachably, for instance, to a towed appliance or to a self-propelling vehicle of some known kind. Alternatively, the inventive apparatus may be mounted permanently on an appropriate type of vehicle.

In accordance with one preferred embodiment, the seed-carrier has the form of an elongated cylindrical slide which is reciprocatingly moveable in a bore which extends transversely through a housing. Formed on the periphery of the cylindrical seed carrier is at least one recess or like cavity which functions as a temporary storage space for the seed to be sown on said cultivated ground and arriving from the seed-magazine.

By permitting seed to migrate gravitationally from a seed-magazine into the recess or recesses in the periphery of the seed-carrier, the carrier will be replenished with a given number of seeds, both continuously and automatically, said number being contingent on the depth and width of the recess or recesses.

The size and the number of the recesses provided in the periphery of the seed-carrier may be varied in dependence on the intended transportation speed of the seed-dispensing apparatus, for instance so as to adapt the seed-dispensing rate accordingly, and also in dependence on the linear extension of the ground surface on which the seed is to be sown. The size of the recess or recesses and also the number of recesses provided will also depend on whether seed is to be sown intermittently or continuously.

Other features of the invention will be apparent from the depending claims.

The invention will now be described in more detail with reference to a non-limiting exemplifying embodiment of an inventive seed-dispensing apparatus and with reference to the accompanying drawings. Although the exemplifying seed-dispensing apparatus is described below with reference to intermittent seed-sowing in conjunction with a soil cultivator, it will be understood that the cultivator does not form any part of the present invention and will not therefore be described or illustrated here. Furthermore, the described and illustrated embodiment of the inventive apparatus is purely an example of such apparatus and does not limit the scope of the invention.

BRIEF DESCRIPTION OF THE DRAWINGS

FIG. 1 is a sectioned view of an exemplifying embodiment of an inventive seed-dispensing apparatus and illustrates the function of a power-transmission arrangement.

FIG. 2 illustrates schematically an arrangement by means of which a blowing effect can be created continuously in the dispensing aperture of the seed-dispensing apparatus.

FIG. 3 illustrates one manner of achieving a desired suction effect in the region of the dispensing aperture of the dispensing apparatus.

FIG. 4 illustrates the apparatus schematically in cross-section taken on the line IV—IV in FIG. 1.

The reference numeral 10 in FIG. 1 identifies generally an embodiment of a seed-dispensing apparatus constructed in accordance with the invention. The apparatus is mounted in a casing 11, which is fitted with a lid 12 having a handle 13, by means of which the lid can be lifted.

The inventive apparatus 10 includes a seed-magazine 14, of circular cross-section preferably a magazine of the kind which can be replenished with seed. The magazine 14 has a lid 15 provided with handle means 16, by means of which the magazine lid 15 can be lifted to refill the magazine.

The apparatus further includes a seed-carrier 17, which in the case of the illustrated embodiment has the form of a cylindrical slide 17 which is mounted for horizontal movement in a horizontal, straight bore 18 provided in a housing 19. The bore 18 extends completely through the housing 19.

In the case of the illustrated embodiment, a first end of the cylindrical seed-carrier 17 is embraced by a sleeve 20 which is detachably connected to the seed-carrier 17 by means of a detachable latch pin 21, said seed-carrier extending completely through said sleeve and protruding slightly from the end thereof distal from the magazine 14.

The apparatus also includes piston-cylinder device comprising a hollow piston 22 which is mounted for limited movement in a space provided in the housing 19 and which is activated by a coil or thrust spring 23 located between a shoulder 24 in the piston 22 and the bottom of a circular slot 25 formed in the housing 19. The reference numerals 26, 27 and 28 each identify seals which seal-off the apparatus 10 from the interior of the casing 11. In one direction of piston movement, the sleeve 20 is in power-transmission connection with the piston 22, as will be described in more detail hereinafter with reference to the manner of operation of the apparatus.

In the region of the second end of the cylindrical seed-carrier 17, i.e. the end remote from the sleeve 20, the housing 19 has a funnel-like configuration and the bottom part of the circular-cylindrical seed-magazine 14 rests on the upper part of said funnel-shaped part in the manner illustrated in FIG. 1. Thus, the funnel-shaped part of the housing 19 communicates with the seed-magazine 14 and, in effect, forms a continuation thereof. As will be seen from FIG. 1, the funnel-shaped part of said housing 19 has a bottom opening which opens out towards the bore 18. The cylindrical seed-carrier 17 has provided sequentially along its peripheral surface one or more, preferably two or three, shallow recesses 30, suitably short recesses 30, which extend transversely to the long axis of the seed-carrier and which are positioned at an angle of about 30°-40° to the vertical plane.

The diameter of the bore 18, at least in the region of the bottom opening of the aforesaid funnel-shaped housing part facing the seed-carrier 17, is sufficiently large to form a further seed-holding space between the seed carrier and the wall of the bore 18. Consequently, seed from the magazine 14 will surround the seed-carrier 17 at of least this region of larger diameter and, as shown in FIG. 4, seed will also fill the space above the seed-carrier 17. The recesses 30 are positioned such that the small seeds will also endeavor to enter the recesses 30, as a result of the influence or weight exerted by the total quantity of seed present in the magazine. These recesses may be dimensioned such as to enable each recess to accommodate from two to three seeds. The walls of the recesses 30 diverge downwards, so as to prevent mutual wedging of the seeds present in the recesses.

The preferred power-transmission means for activating the seed-carrier 17 of the apparatus illustrated in FIG. 1 will now be described in more detail.

In the case of the illustrative embodiment, the inventive seed-dispensing apparatus 10 is assumed to be mounted on an appliance (not shown) which is towed behind a tractor (not shown). The towed appliance may have the form of a soil cultivator, for instance of the kind illustrated and described in SE-A-7317179-5. Soil cultivators of this kind are used to prepare or cultivate the soil in a particular manner, e.g. such as to prepare a seed bed from rough ground. Such soil cultivation may comprise ploughing a continuous furrow or shallow in the ground or the preparation of given patches of soil in accordance with the so-called front-mound principle, i.e. a cultivating process in which earth is pushed in front of a mechanical spade to leave a shallow furrow while heaping the earth in front of the spade, whichever is considered the most suitable under the prevailing circumstances. The towed appliance is thus provided with a ground scarifier (not shown), the rotating shaft of which also drives a camming plate 31 which is mounted for rotation in the direction of the arrow A shown in FIG. 1 and which coacts drivingly with a cam roller or like cam follower 33, which is journaled for rotation on a journal pin 32. The pin 32 is connected to a bracket 34 in the form of an obliquely angled part of a vertical arm 35, which is pivotly mounted on a journal pin 36 located at the bottom of said arm. The upper part 37 of the arm is constantly in engagement with an intermediate member 38, which may be in screw engagement with a bore 19 formed in a slideable sleeve 40. The sleeve 40 extends through one end wall of the casing 11, such that one end of the sleeve 40 will therefore be located externally of the casing-end wall and the other end of said sleeve located inwards of said end-wall. This inwardly located end of the sleeve 40 lies against the first end of the seed-carrier 17 protruding from the sleeve, or possibly alternatively against the moveable sleeve 20 itself.

The camming plate 31 is configured so that the seed-carrier 17 is able to move between two positions, namely between a first position in which the recess or recesses 30 provided on the seed-carrier 17 are located beneath the magazine opening so that seed is able to enter the recesses in the aforesaid fashion, and a second position in which the seed-carrying recesses communicate with the downwardly facing seed-dispensing aperture 41 of the apparatus 10. This feed movement of the seed-carrier 17 takes place against the action of the coil or thrust spring 23, said sprinq being biased in a direction opposite to that of the force-transmitting direction. As will be seen from FIG. 1, this feed movement will also be transmitted to the piston 22, via the sleeve 20, and the piston will consequently move in the same direction as the seed-carrier 17.

When the seed-carrier 17 is located in the second of its two positions, the recesses 30 are positioned above the seed-dispensing aperture 41 and seed will fall gravitationally through said aperture, which is normally located only a short distance above the surface of the ground (not shown), and will be dispensed in spaced relationship along the cultivated soil surface. As before mentioned, seed will surround at least a part of the cylindrical seed-carrier 17. When the seed-carrier is located in its seed-receiving position, these seeds are pressed against the smooth cylindrical surface of the carrier, and in order to prevent seed from adhering to the seed-carrier and from being entrained towards the dispensing aperture by movement of the seed-carrier, a doctor or like device 29 is mounted adjacent the cylindrical surface of the seed-carrier 17. This device 29 will preferably have the form of a brush operative to brush seed from the smooth cylindrical surface of the seed-carrier and return said seed to the seed-magazine.

It has been said in the aforegoing that the shallow recesses 30 are formed so that each recess is capable of accommodating a small number of seeds, for instance from two to five seeds. The reason for wishing to accommodate several seeds in each recess is because it cannot be guaranteed that each seed sown in the ground will germinate and root. Consequently, in order to provide a safety margin in this respect, each recess 30 is preferably dimensioned to accommodate seeds in a number which at least corresponds to the estimated germination probability of the seed in question. It has also been mentioned that the number of recesses provided is contingent on the linear extension of the intermittent patches of cultivated soil.

The described seed-dispensing apparatus will normally operate in a manner such as to dispense onto cultivated ground a suitable, small number of seed in mutually spaced relationship in a straight or substantially straight line.

The nature of the soil in those regions where the seed is to be sown may, however, differ radically. For instance, the soil may be extremely wet and soggy, despite the fact that twigs, small branches or other forest material still remains in the cultivated seed beds. When the soil is saturated with water, the water is liable to splash onto the walls of the seed-dispensing aperture, causing the seed to fasten to the aperture walls. Similarly, twigs and the like present in the soil are liable to be lifted and forced into the aperture and prevent the seed from moving freely there through. Another hazard is that side winds are liable to blow the seed away from the cultivated soil surface, therewith negating the precision in which the seeds are dispensed.

Accordingly, a further object of the invention is to provide means which will ensure that the seed is dispensed through said aperture in the manner desired. To this end, the seed-dispensing aperture is provided along at least a part of its longitudinal extension with means which impart to the falling seed a velocity component which is additional to that obtained by gravity. An advantage is afforded when this further velocity component is such as to ensure that the walls of the aperture 41 will be kept as dry as possible.

FIGS. 2 and 3 illustrate an exemplifying embodiment of one such means, which will be described below with reference to said Figures.

As before mentioned, the piston 22 of the seed-dispensing apparatus is reciprocatingly moveable. Formed on respective sides of the piston is a first air chamber 50 and a second air chamber 51. In one position of the seed-carrier 17, in which said carrier is located in its seed-receiving position, the air chamber 50 has a larger, or much larger volume, than the air chamber 51. As the seed-carrier 17, and therewith the piston 22, moves from said first to said second carrier-position, a partial vacuum is generated in the air chamber 51. The air chamber 51 communicates with the surrounding atmosphere via a light spring-biased valve 52 and a channel 52', wherewith the partial vacuum prevailing in said chamber will cause the valve 52 to open and allow air to enter the chamber 51. During this movement stroke of the piston 22, the air present in the air chamber 50 will be caused to flow against the pressure exerted by a light spring-biased valve 53 and out through a channel 54 which discharges into an ejector orifice 55 in the seed-dispensing aperture 41, this ejector orifice being described in more detail with reference to FIG. 3. It will be understood from this that air is constantly blown into the seed-dispensing aperture as the piston moves towards the seed-dispensing position of the cylindrical seed-carrier.

During the return movement of the piston 22, during which movement seed present in the recesses 30 leaves the seed-carrier 17 and falls gravitationally through the dispensing aperture 41, the spring-biased valve 53 is closed and, at the same time, a valve 56 opens under the influence of the partial vacuum in the air chamber 50, and causes atmospheric air to be pressed into the chamber 50, through a channel 57 coacting with the valve 56 and communicating with the ambient atmosphere. At the same time, the previously open valves 52 and 54 will close and a fourth, spring-biased valve 58 will open instead and cause the air previously drawn-in by suction via the valve 52 to flow out through the ejector orifice 55, and blow into the seed-dispensing aperture 41, via a passage 59. As a result of the alternating action of the suction valves 52, 56 and the blowing valves 53, 58, the air present in the two air chambers 50, 51 will ensure that a powerful air-stream will continuously act on the seed-dispensing aperture 41.

FIG. 3 illustrates schematically the ejector arrangement in FIG. 2. The air caused to flow towards the seed-dispensing aperture 41 through the passages 54 and 59 passes through a vertically extending, annular channel 60 which presents a constriction 61 at the lower edge of said channel. This constriction functions to create an ejector effect which imparts to the seed falling from the recesses 30 on the periphery of the seed-carrier 17 a further velocity component which ensures that the seed will be brought into contact with the cultivated soil in well-defined spaced relationship and that the air will dry the walls of the dispensing aperture 41.

Although the inclusion of such an ejector effect is to be preferred, the presence of the ejector arrangement is not absolutely necessary, since the afore-described blowing of air into the seed-dispensing aperture has a positive influence on the falling seed and may be sufficient to ensure that the seed is dispensed in the manner intended, in the absence of an ejector effect. When the inventive apparatus does not include an ejector arrangement, the air flows should be directed at a small angle in towards the centre of the aperture 41.

Accordingly, the inventive seed-dispensing apparatus is based on the principle that the towing or towed appliance on which it is mounted will be moved along the ground to be sown at a predetermined speed. This appliance will carry the inventive apparatus, comprising a seed-carrier in the form of a reciprocatingly moveable, cylindrical slide to which seed is fed directly from a seed-magazine. The speed at which the seed-carrier moves backwards and forwards can be related to the intended forward speed of the appliance carrying said apparatus. It will be understood that the invention is not restricted to the use of the illustrated force-transmission arrangement illustrated in FIG. 1, and that any appropriate powering device can be used to this end. Neither need the novel seed-dispensing apparatus be combined with a soil cultivator, but can equally as well be combined with any self-propelling vehicle whatsoever, and the force required to move the seed-carrier can be provided in some other way.

It will also be obvious to those skilled in this art that a plurality of inventive seed-dispensing apparatus can be placed side-by-side.

The aforedescribed exemplifying embodiment is intended for sowing seed intermittently. When the novel apparatus is used to sow seed continuously, the seed-magazine will have a larger seed-storing capacity and the apparatus will be provided with a second seed-dispensing aperture opposite to the illustrated aperture 41. The number of recesses provided on the seed-carrier will then be increased correspondingly.

I claim:

1. An apparatus for sowing seed comprising:
   at least one seed-magazine;
   at least one seed-dispensing aperture,
   at least one seed-carrier provided with means for receiving a fixed number of seeds from said magazine;
   a piston-cylinder device having a reciprocable piston connected to said seed carrier;
   means for generating a substantially vertical air flow in said seed-dispensing aperture which coacts with said piston, in at least one direction of piston movement; and
   force-transmission means operative to move said seed-carrier between a seed receiving position and at least one seed-dispensing position, in which said seed carrier communicates with said seed-dispensing aperture and in which seed-dispensing position the seed carried by said carrier is caused to fall down through said seed-dispensing aperture.

2. Apparatus according to claim 1, wherein said seed-carrier has the form of a circular-cylindrical slide mounted for reciprocating movement in a bore formed in a housing; and in that the seed-carrier has provided on its periphery at least one recess which serves as a temporary storage space for seed arriving from the seed-magazine and intended to be sown onto the ground below.

3. Apparatus according to claim 2, wherein said at least one recess in the reciprocatingly moveable seed-carrier has a downwardly tapering cross-section.

4. Apparatus according to claim 1, wherein said seed-carrier is intended to work in the horizontal plane; in that the seed-magazine is located substantially vertically above the seed-carrier; and in that the seed-dispensing aperture is located substantially vertically below the seed-carrier and displaced forwardly in the horizontal plane relative to said seed-magazine.

5. Apparatus according to claim 1, wherein a portion of the lower part of the seed-magazine comprises a space which surrounds the seed-carrier at least partially.

6. Apparatus according to claim 1, wherein a device is mounted in the path travelled by the seed-carrier when moving from a seed-receiving position to a seed-dispensing position.

7. Apparatus according to claim 1, wherein the apparatus is intended to coact with a towed or self-propelling soil cultivating appliance comprising a scarifying wheel; in that a camming plate or disc is mounted for co-rotation with said scarifying wheel; and in that the camming plate coacts with power-transmission means located between said camming plate and the seed-carrier and operative to move the seed-carrier from a seed-receiving position to a seed-dispensing position upon rotation of said scarifying wheel.

8. Apparatus according to claim 7, wherein the apparatus includes a coil which functions to return the seed-carrier from a seed-dispensing position to a seed-receiving position.

9. The apparatus according to claim 1, wherein said apparatus comprises a housing which forms said at least one seed-dispensing aperture and is configured to create an ejector effect in said at least one aperture, such ejector effect increases the vertically directed force acting upon the seed falling from said seed-carrier.

* * * * *